No. 649,352. Patented May 8, 1900.
C. H. RECTOR.
PORTABLE HOUSE.
(Application filed Jan. 15, 1900.)
(No Model.) 7 Sheets—Sheet 1.
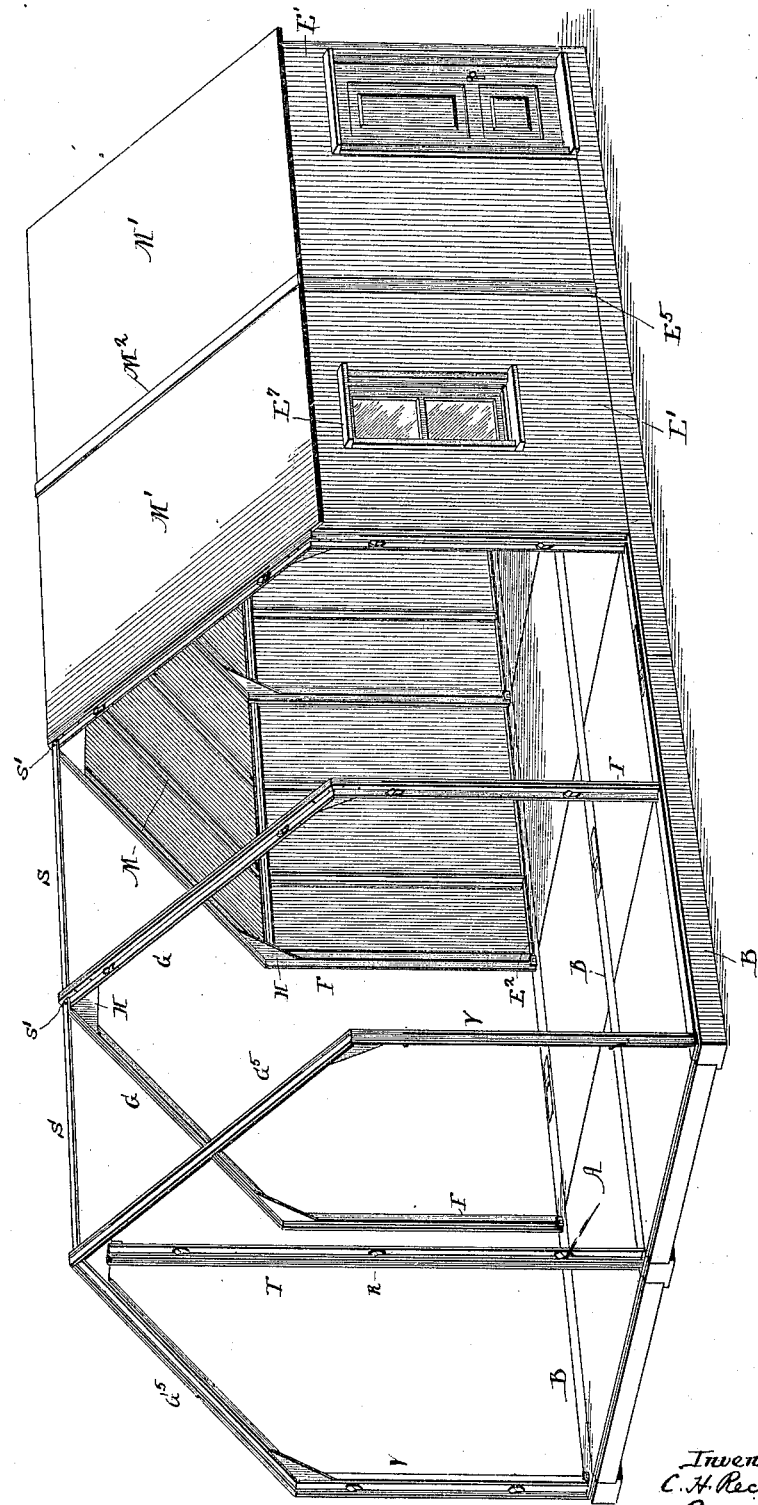

No. 649,352. Patented May 8, 1900.
C. H. RECTOR.
PORTABLE HOUSE.
(Application filed Jan. 15, 1900.)
(No Model.) 7 Sheets—Sheet 2.
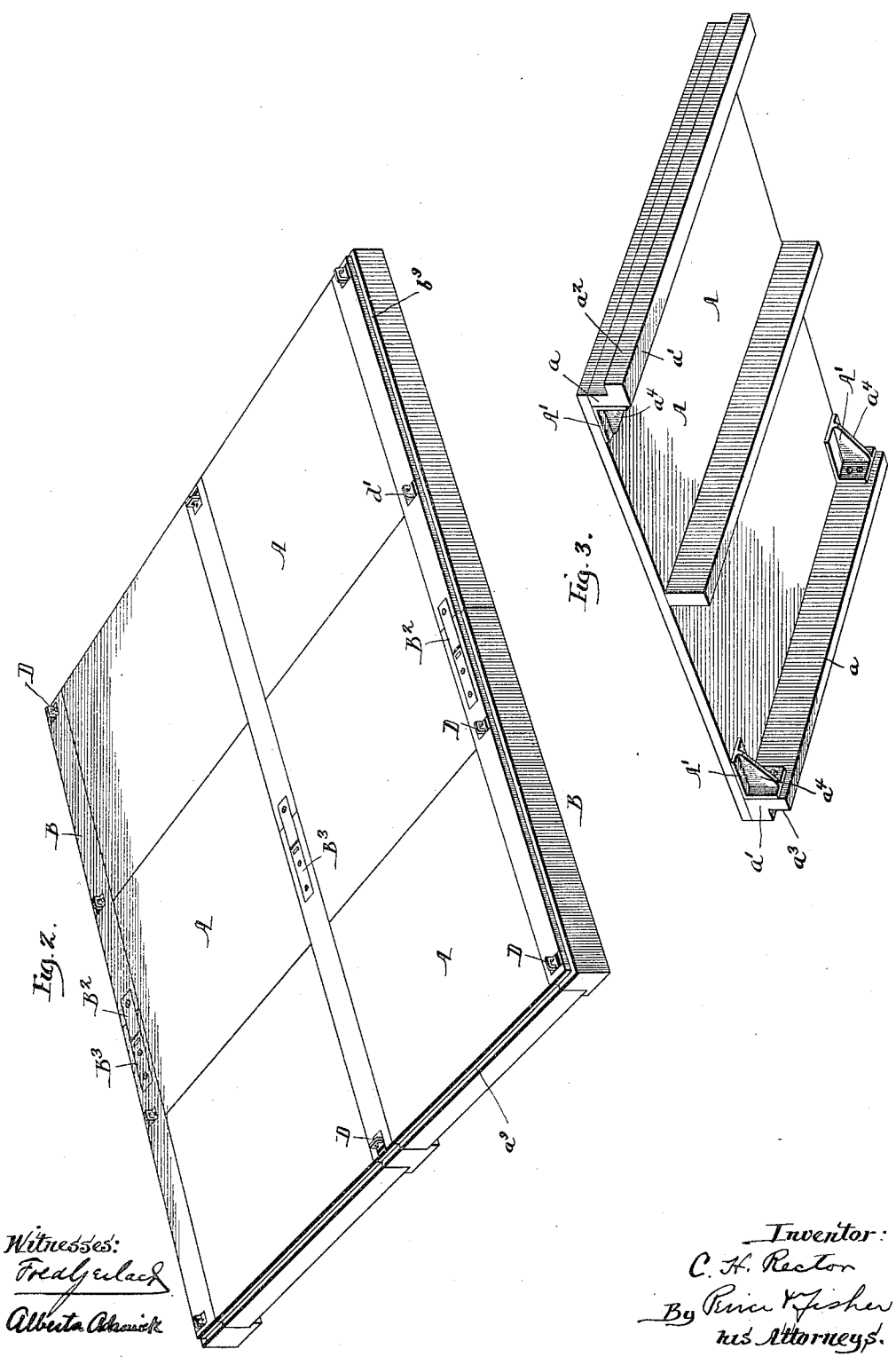

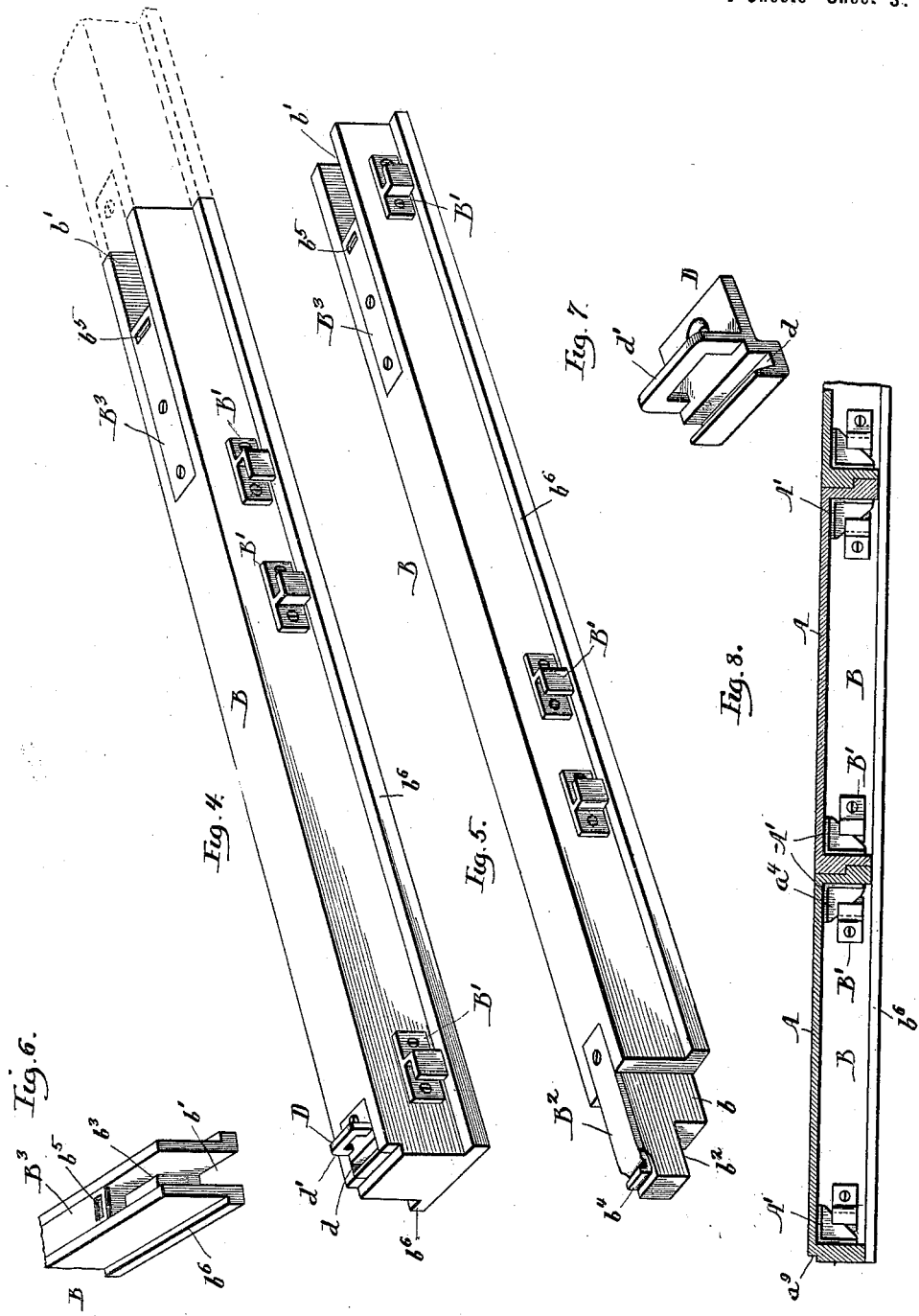

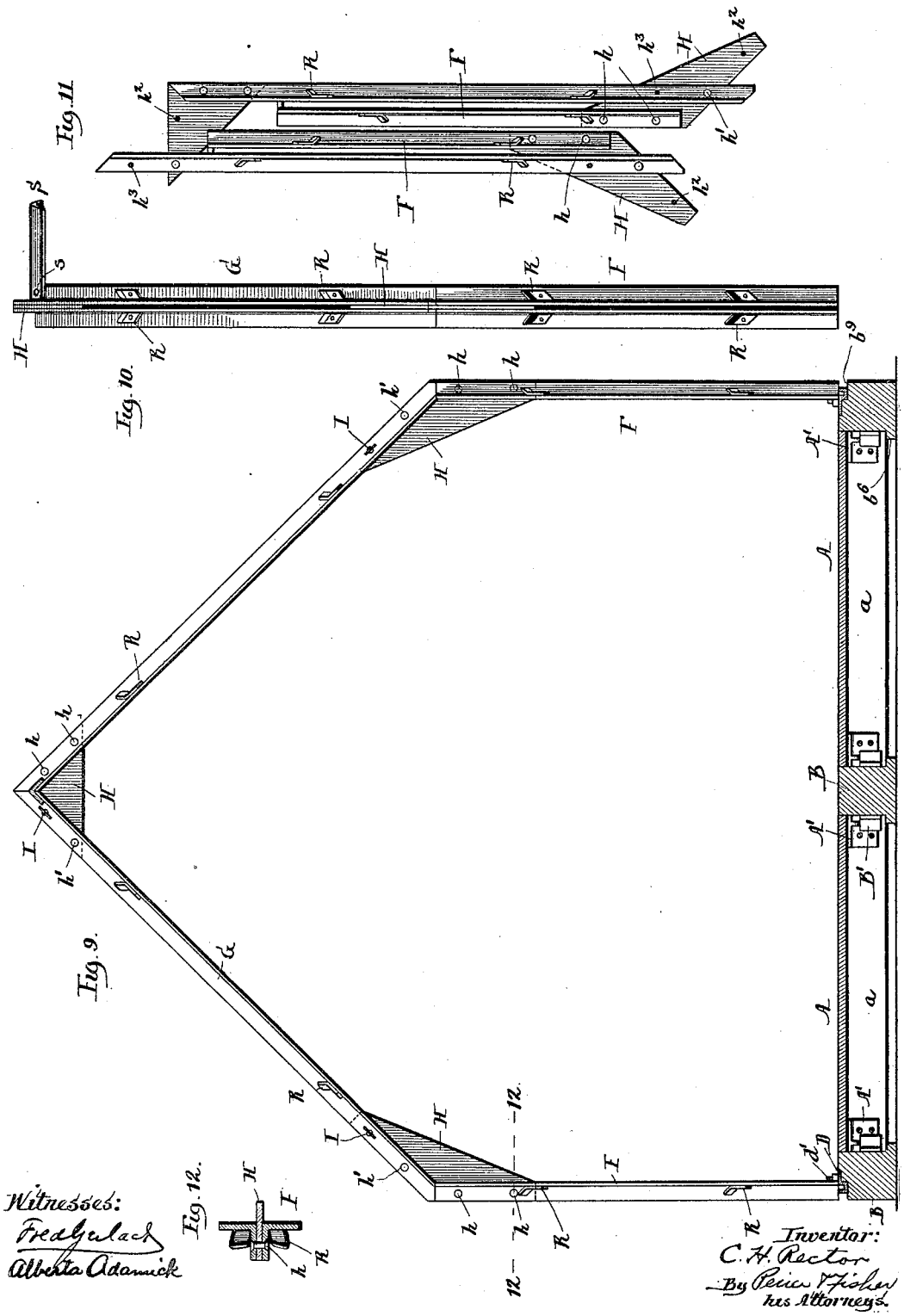

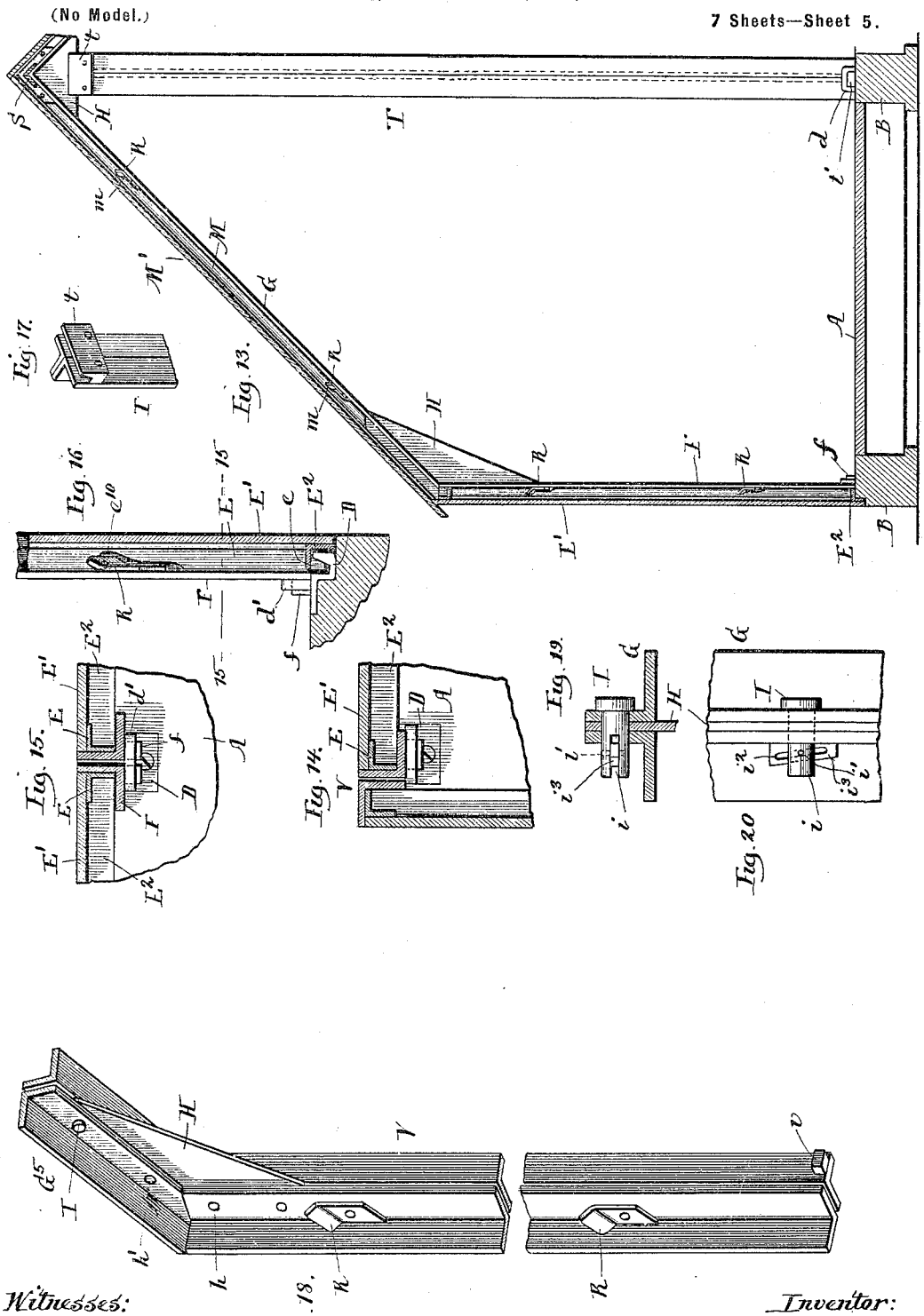

No. 649,352. Patented May 8, 1900.
C. H. RECTOR.
PORTABLE HOUSE.
(Application filed Jan. 15, 1900.)
(No Model.) 7 Sheets—Sheet 6.

Witnesses:
Fred Galack
Alberta Adamick

Inventor:
C. H. Rector
By Peirce & Fisher
his Attorneys.

No. 649,352. Patented May 8, 1900.
C. H. RECTOR.
PORTABLE HOUSE.
(Application filed Jan. 15, 1900.)
(No Model.) 7 Sheets—Sheet 7.
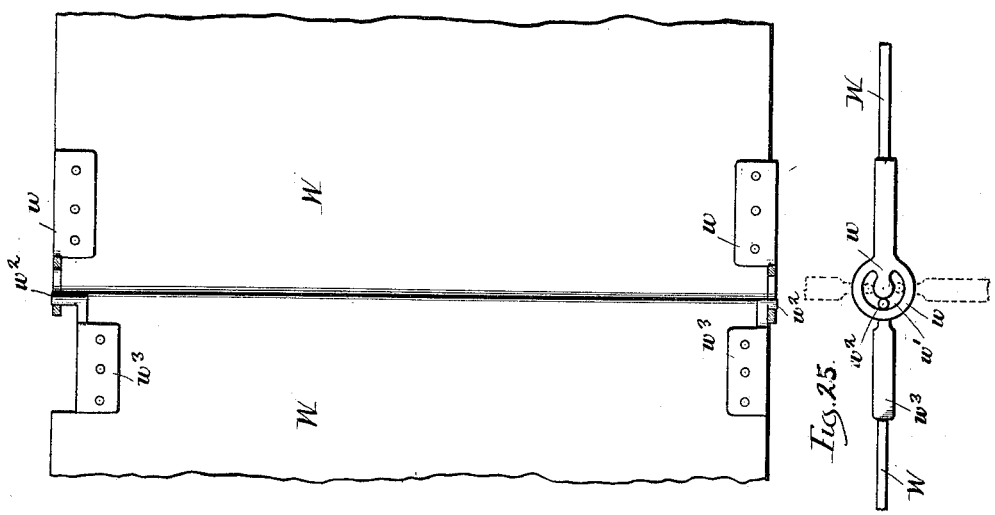
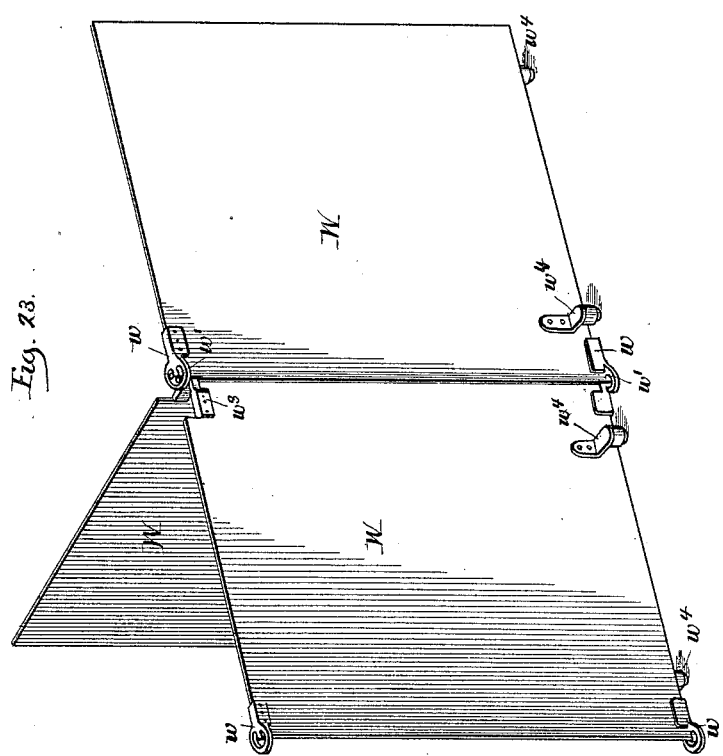
Witnesses:
Fred G. Wlaich
Alberta Adamick
Inventor:
C. H. Rector
By Peirce & Fisher
his Attorneys.

UNITED STATES PATENT OFFICE.

CHARLES H. RECTOR, OF CHICAGO, ILLINOIS.

PORTABLE HOUSE.

SPECIFICATION forming part of Letters Patent No. 649,352, dated May 8, 1900.

Application filed January 15, 1900. Serial No. 1,417. (No model.)

*To all whom it may concern:*

Be it known that I, CHARLES H. RECTOR, a resident of Chicago, in the county of Cook and State of Illinois, have invented certain new and useful Improvements in Portable Houses, of which the following is a full, clear, and exact description.

The invention has for its object to provide a portable house that is simple and cheap in construction, that can be readily put together and taken apart by unskilled labor, that can be packed into very small compass for transportation or storage, that can be enlarged or contracted, as may be required, and that shall afford a tight and substantial structure when set up for use. A portable house having these characteristics is especially adapted not only for military purposes, as in the construction of temporary quarters, hospitals, and the like, but is also particularly well adapted for the use of contractors, surveyors, miners, lumbermen, and others who from time to time must shift their base of operations and who find the use of tents, particularly in cold and damp weather, unhealthy and objectionable.

My invention consists in a portable house embodying the features of improvement hereinafter described, illustrated in the accompanying drawings, and particularly pointed out in the claims at the end of the specification.

Figure 21:
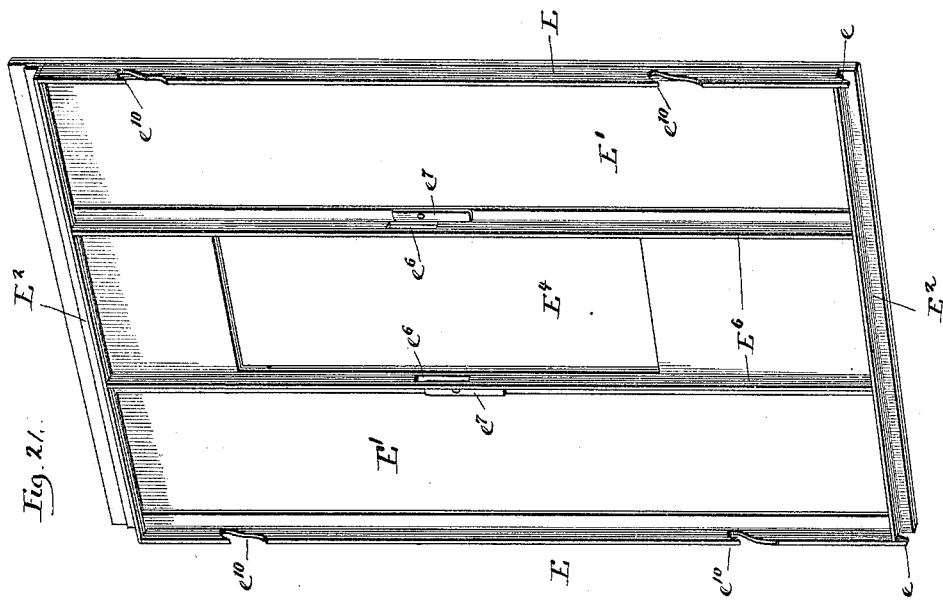
Figure 22:
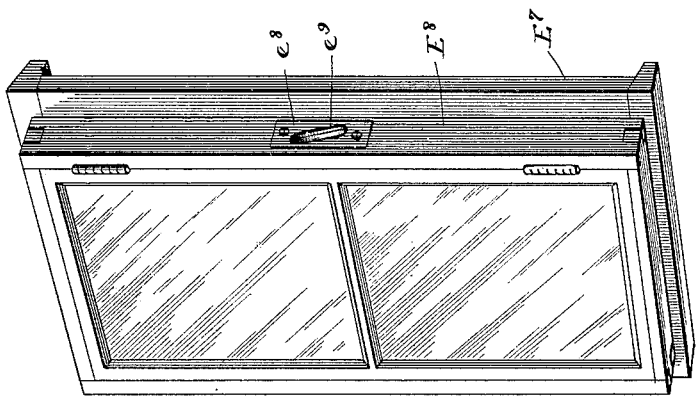

Figure 1 is a perspective view of a portable house embodying my invention. Fig. 2 is a detail perspective view of part of the sectional flooring. Fig. 3 is a detail perspective view of one of the floor-sections. Fig. 4, 5, and 6 are detail perspective views of the sill-sections. Fig. 7 is a detail perspective view of one of the sill-plates to engage the stud-posts. Fig. 8 is a detail view, in vertical section, showing the floor-sections locked to the sill-sections. Fig. 9 is a view in vertical transverse section through the house shown in Fig. 1, the roof and side boards being omitted. Fig. 10 is a detail end view of one of the rafters. Fig. 11 is a view of one of the roof-trusses and stud-posts connected therewith, the parts being shown in folded or knockdown condition. Fig. 12 is a detail view showing a portion of one of the corner stud-posts. Fig. 13 is a view in vertical cross-section through a portion of a house shown in Fig. 1, with the roof-boards and side boards in position. Fig. 14 is a detail view, in horizontal section, through one of the stud-posts at the corner of the house and through adjacent portions of the side boards and connecting devices. Fig. 15 is a view in horizontal section on line 15 15 of Fig. 16. Fig. 16 is a detail view, in side elevation, through the lower portion of one of the stud-posts and the sill interlocked therewith, a portion of the side board being shown in vertical section. Fig. 17 is a detail perspective view of the upper end of the king-post. Fig. 18 is a perspective view, on an enlarged scale, of one of the corner stud-posts. Fig. 19 is a view in vertical cross-section through the rafter shown in Fig. 20. Fig. 20 is a detail plan view of a portion of a rafter with the keeper pin in position. Fig. 21 is a detail perspective view from the inside of one of the side boards, having a window-opening therein. Fig. 22 is a perspective view of a window-casing adapted to set within the opening in the side board shown in Fig. 21. Fig. 23 is a perspective view of the adjustable partition. Fig. 24 is an enlarged view showing the manner of joining the sections of the partition. Fig. 25 is a plan view showing the manner of joining the sections of the partition.

The floor of my improved portable house will first be described, reference being had more particularly to Figs. 1 to 9 of the drawings. This floor consists of sectional floor-boards A, united to and supported by sill-sections B. The preferred construction of the sectional floor-boards is that illustrated in Fig. 3 of the drawings, where each of these sections is shown as provided at its ends with cross-bars $a$ and $a'$, these cross-bars being preferably provided, respectively, with tongues $a^2$ and grooves $a^3$, that will interlock, as shown in Fig. 8, when the floor-board sections are in position for use. To the under side of the floor-board sections A and preferably connected to the cross-bars $a$ and $a'$ and to the floor-sections adjacent the corners are the key plates or brackets A′, these key plates or brackets being shown as provided with webs $a^4$, having inclined inner edges adapted to engage the lock-plates B′, that are secured to the sides of the sill-sections B. Each of the sill-sections intermediate the end sections of the floor is shown as formed at one end with a tenon $b$ and at the opposite end with a mortise $b'$, adapted to receive the tenon $b$ of the adjoining sill-section. The tenon $b$ is formed with a cut-away space $b^2$ at the under side of its end, and the mortise $b'$ is formed with a corresponding shoulder $b^3$ to enter said cut-away space $b^2$. Over the tenon $b$ extends a male lock-plate $B^2$, having an upwardly-turned hook $b^4$ at its end, this hook being adapted to engage an eye $b^5$ of a corresponding female lock-plate $B^3$, that is secured in a suitable countersink at the end of the mortise of the adjoining sill-section, the eye $b^5$ extending somewhat over the edge of the mortise.

By reference more particularly to Figs. 2, 4, and 8 of the drawings it will be seen that when the sill-sections are to be placed together the tenon $b$ of one sill-section will be set within the mortise of the adjoining sill-section, the hook $b^4$ of the male lock-plate $B^2$ being inserted into the eye $b^5$ of the female lock-plate $B^3$. When the sill-sections are then brought to requisite position, the tenon-and-mortise joints not only securely hold the sill-sections against lateral movement, but the hook $b^4$ and eye $b^5$ securely lock the sill-sections against longitudinal movement. Each of the sill-sections B is shown as formed adjacent its bottom with laterally-extending shoulders or flanges $b^6$, that run from end to end of the sill-sections and beneath the floor-board sections when the latter are in position for use.

By reference to Fig. 2 of the drawings it will be observed that the sill-sections at the ends of the house are square or without tenon or mortise, as such joints are not necessary at these points. When the sill-sections have been set together as above described, the floor-sections A will be placed in position, with their key-plates $A'$ entering the lock-plates $B'$ of the sill-sections. The floor-sections are made shorter than the sill-sections, so that these floor-sections shall break joint with the sill-sections, and when the floor-sections are set in position, as shown in Figs. 1, 2, and 8, the key-plates $A'$ and lock-plates $B'$ will not only serve to securely retain the floor-sections in place, but will also serve as an additional means for securely uniting the sill-sections together. By forming the key-plates $A'$ with inclined edges these plates wedge into the lock-plates $B'$, and thus more effectively serve to draw the parts together and rigidly hold them in close position.

The sill-sections that extend along the sides of the house are provided upon their tops with lock-plates D, the preferred construction of which is illustrated in detail in Fig. 7 of the drawings. Each of these lock-plates is shown as comprising a seat $d$ and a vertical loop or eye $d'$, and these plates D are preferably formed of cast metal. The seat $d$ of each lock-plate D is adapted to receive a lug $e$ (see Figs. 16 and 21) at the lower end of the flange-plate E of the corresponding side board $E'$, and the loop $d'$ is adapted to receive an inwardly-extending lug $f$, that is provided at the bottom of each stud-post F. Preferably the outer wall of the seat $d$ and the outer edge of the lug $e$ are inclined, (see Fig. 16,) so that after the lower end of the stud-post F has been set in place with its lug $f$ in the eye $d'$, the lug $e$ will wedge into the seat $d$ and securely retain the lug $f$ within the loop $d'$. Each of the stud-posts F (except the corner stud-post) is shown as T-shaped in cross-section, and preferably these stud-posts are formed by joining together two metal angle-bars, although manifestly the stud-posts might be formed from a single bar of the shape shown. The rafters G are also preferably formed of T-shaped cross-section by riveting together two angle-bars, as shown, and these rafters G are pivoted together and to the stud-posts by means of the brace-plates or truss-plates H, as clearly shown in Figs. 11 and 12 of the drawings. Preferably the brace-plates H are of triangular shape, and by preference each brace-plate H that unites the stud-post F to the lower end of the adjacent rafter G is rigidly riveted, as at $h$, (see Fig. 12,) between the angle-bars of which the stud-post is formed, (see Figs. 10 and 12,) and is pivoted, as at $h'$, to the adjacent end of the rafters between the angle-bars that comprise the rafters G. By means of this construction the stud-post, when the parts are to be folded, can be turned parallel to the rafter, and when the parts are extended for use, as shown in Fig. 12, the brace-plate H will be held in the position there shown and will be rigidly secured by means of a keeper-pin I, the construction of which is more particularly illustrated in Figs. 19 20 of the drawings, this keeper-pin passing through a hole $h^2$ (see Fig. 11) in the brace-plate and through holes $h^3$ in the vertical parts of the angle-bars of which the rafter is composed.

The rafters G are pivotally connected together at their upper ends by brace-plates or truss-plates H, corresponding to the plates by which the rafters are connected to the stud-posts, and preferably the truss-plates H that connect the upper ends of the rafters are rigidly fastened, as at $h$, between the angle-bars that comprise one rafter and are pivoted, as at $h'$, in the open space between the angle-bars that comprise the adjacent rafters. The plates H that connect the rafters are provided with holes $h^2$, adapted to come in line with the holes $h^3$ when the rafters are in the position shown in Fig. 12, and when in this position the parts will be securely held by means of a keeper-pin I.

By reference to Figs. 19 20 of the drawings it will be seen that the keeper-pin I consists of a headed pin having its inner end formed with a slot $i$, through which passes a pin $i'$, this pin $i'$ passing through a slot $i^2$ of the wedge-plate $i^3$. By turning the wedge-plate $i^3$ to the position shown by dotted lines in Fig. 20, the pin and wedge-plate can be passed through the holes in the rafters and brace-plate H, and then by moving the wedge-plate $i^3$ at right angles it can be caused to firmly secure the parts in position. The slot $i^2$ being obliquely arranged with respect to the plate $i^3$ will cause the plate $i^3$ to act as a wedge in drawing and holding the parts together.

By reference more particularly to Fig. 21 of the drawings it will be seen that each of the side sections or boards E' is provided adjacent its vertical edges with the plates E and adjacent its top and bottom edges with the plates $E^2$, these plates E and $E^2$ being preferably formed of angle-iron, as shown. The side section illustrated in Fig. 21 of the drawings is shown as provided with an opening $E^4$, adapted to receive a window-casing $E^3$, and adjacent the sides of the opening $E^4$ extend the angle-plates $E^6$ from top to bottom of the side section E'. In practice I prefer to form the side sections E', and as well, also, the roof-sections, of composition-board, as several varieties of this material are now found upon the market, and they make exceedingly light and durable substitutes for wood or metal.

The angle-bars E, $E^2$, and $E^6$ are attached to the side sections by suitable rivets or in any convenient manner. In the bars $E^6$ are formed slots $e^6$, and adjacent these slots are pivoted the keys $e^7$. To each side of the window-casing is attached a key-plate $e^8$, having an inclined slot $e^9$ therein, and when the window-casing $E^3$ is set within the opening $E^4$ the slot $e^9$ at each side of the casing will come opposite the slot $e^6$ in the adjacent bar $E^6$. Around the window-casing $E^3$ extends a frame $E^7$, adapted to bear against the outer face of the side section E' when the window-casing is in position for use, and when in such position it may be securely locked there by so turning the pivoted keys $e^7$ that their ends shall pass through the slot $e^6$ and into the inclined slots $e^9$ at the sides of the window-casing. Inasmuch as the slots $e^9$ are inclined, the turning of the keys $e^7$ as they ride down the inclined slots will draw inwardly the window-casing, thereby causing the frame $E^7$ to bear tightly against the outer face of the side section E'. The object in forming the window-casing detachably from the side section is to enable the window-casing, with its glass, to be carefully packed in order to avoid breakage. Each of the side bars E of the side sections is shown as formed with hooks $e^{10}$, and these hooks will enter seats or pockets R, that are secured to the stud-posts F. The seats or pockets R are shown as open at the top and as inwardly and downwardly inclined, so that as the hooks $e^{10}$ enter the pockets R and are forced downward therein they will serve to draw the edges of the side boards snugly against the central ribs of the stud-posts F. The seats or pockets R are shown as formed of angular plates that are riveted to the stud-posts; but manifestly these seats or pockets may be formed in other ways without departing from the spirit of the invention. Preferably the vertical edges of the side sections E' have attached thereto guard-strips $E^5$, which when the side sections are set in position for use serve to cover the vertical joints between the sections and protect the same against the weather.

By reference to Figs. 9, 10, 13, and 18 it will be seen that each rafter is provided upon opposite sides of its central rib with pockets R, adapted to receive hooks $m$, that are formed on the side bars M, attached to the inner side of each of the roof-sections M' adjacent its edges. The pockets R are downwardly and inwardly inclined, so that when the roof-sections are set in position and forced downwardly they will tend to draw the parts snugly together, and preferably each of the roof-sections is provided along its edges with guard-strips $M^2$, that serve to cover the joints between the sections and prevent the passage of water therethrough. By reference to Fig. 13 it will be seen that the bars M of each of the roof-sections is cut away adjacent its top and bottom, so as to avoid contact at such points with the ridge-pole S and with the upper edges of the side sections E'. The ridge-pole S is formed in sections. Each section of this ridge-pole is pivotally connected at one end, as at $s$, to one of the rafters and at its opposite end is provided with a pin $s'$, adapted to enter a hole in the adjacent rafter. My purpose in forming the ridge-pole of sections pivotally connected to the rafters is to permit the ridge-pole sections to be folded compactly with the rafters for shipment or storage and when in use to be extended and securely joined to one of the rafters of the next roof-truss.

Each of the king-posts T at the ends of the house is preferably T-shaped in cross-section and is shown as formed of angle-plates riveted together in the same manner as the stud-posts and rafters hereinbefore described. By reference to Figs. 13 and 17 it will be seen that the top of each king-post is provided with a socket $t$, that will engage with the brace-plate H of the corresponding end roof-truss, and at its bottom each king-post is formed with a lug $t'$, adapted to enter the eye $d'$ on the lock-plate D, corresponding in construction to the lock-plate shown in Fig. 7 and located at the end of the central sill, as shown in Fig. 4 of the drawings. The end boards of the house will be similar in construction to the side boards, being simply modified in shape to conform to the gable, and these end boards will have lugs at their bottoms to enter the seat $d$ of the plate D, and thus retain the lug $t'$ at the lower end of the king-post in secure engagement with the eye $d'$ of the plate D. It will be understood, of course, that the ends of sills that are exposed at the ends of the house will be without tenon or mortise, as shown in Figs. 1, 2, and 4 of the drawings. By reference to Fig. 2 it will be seen that the sills B, that extend along the sides of the house, are formed with a rabbet $b^9$ to receive the lower edge of the side boards, and it will be seen also that the end floor-sections A will be formed with similar rabbets $a^9$ to receive the lower edges of the end sections of the house.

By reference more particularly to Figs. 1 and 14 of the drawings it will be seen that the stud-posts at the corners of the house are somewhat different in shape from the intermediate stud-posts above described. These corner stud-posts V are preferably formed of Z-shaped cross-section by riveting together two angle bars, and the rafters $G^5$, located at the end of the house and connected to these corner stud-posts, will also be similarly formed and shaped. The bottoms of the corner stud-posts, however, are provided with inwardly-extending lugs $v$, adapted to engage the loops or eyes $d'$ of the lock-plates D, that are located at the ends of the corner-sills, and these corner stud-posts will be held in place in the same manner as the stud-posts above described. It will be understood, of course, that the corner stud-post V will be provided with pockets R to receive the hooks on the plates E of the adjacent side sections E', and the brace-plate H will pivotally connect the corner stud-posts V and the end rafters $G^5$ in the same manner as the brace-plates H connect the stud-posts and rafters hereinbefore described.

It will be understood that one of the side sections or, if preferred, one of the end sections of the house will be provided with a door; but unless this door has glass in it it may be permanently joined to such part.

It will be understood also that the various sill-sections, floor-sections, side, end, and roof sections, and as well also the various rafters and stud-posts are interchangeable, except as to the parts designed for particular locations—as, for example, at the sides or ends of the house. When a house is to be set up, the sill-sections will be first set together as above described, and the floor-sections will then be placed in position between the sills and with the key-plates of the floor-sections engaging the lock-plates of the sills. By using the proper number of sills and floor-sections the floor of the house may be given any desired length or breadth within the multiples of the dimensions of the individual sections. Having laid the floor, the frames, consisting of the roof-trusses and stud-posts, will next be extended and set in place, and the sections of the ridge-pole will be also extended, so as to engage the succeeding roof-trusses. It will be understood, of course, that the keeper-pins I will be inserted in the proper places, so as to securely retain the parts in extended position. The side boards will then be set in place, with their studs $e$ in the seats $d$ of the lock-plates D (thereby securely retaining the stud-posts against displacement) and with their hooks $e^{10}$ in the pockets R of the stud-posts. The roof-boards M will then be placed in position between the rafters, the hooks $m$ of the roof-boards engaging the pockets R of the rafters and serving to lock the roof-boards securely in position. The end boards may be finally set in place, and thereafter the window-casing $E^8$ may be set within the opening $E^4$ of one of the side sections, as above described. By using the requisite number of frames and of side, end, and roof sections it is manifest that the house can be made of any desired length. If from time to time it is desired to extend the length of the house, this can readily be done by means of additional frames, sills, floor-boards, side and roof sections. If a house of greater width is required, then a different size of frame will be employed.

In order to enable the interior of the house to be divided into rooms or compartments, I prefer to employ the movable partition shown in Figs. 23 and 25 of the drawings. This partition consists of a series of division plates or sections W. One at least of the division-plates W is provided at top and bottom with socket-plates $w$, fixed thereto and having curved slots $w'$, adapted to receive pintles $w^2$, that project from pintle-plates $w^3$, attached to the tops and bottoms of others of the division-plates W. By reference to Fig. 24 it will be seen that the top pintles are sufficiently longer than the bottom pintles to enable these top pintles to be first inserted through the slot $w'$ of the plate $w$ and then, without withdrawing said top pintle, to allow the bottom pintle to be inserted in the slot of the bottom pintle-plate. By this use of slotted plates and pintles for connecting the division-plates these division-plates can be turned to any desired angle or can be folded compactly together for transportation or storage, and by means of these partition-plates the interior of the house can be divided off into rooms or sections, as required. In order to enable the partition to be shifted readily from point to point of the house, I prefer to attach to the bottoms of each of the division-plates W suitable casters $w^4$ on which the division-plates are sustained.

It is manifest that the details of construction above described may be varied within wide limits without departing from the spirit of the invention, and it will be understood also that features of the invention may be used without its adoption as an entirety.

Having thus described my invention, what I claim as new, and desire to secure by Letters Patent, is—

1. In a portable house, a floor comprising sills formed of sections, the abutting ends of which are adapted to interlock, and sectional floor-boards and means for detachably interlocking said floor-boards with said sill-sections.

2. In a portable house, a floor comprising interlocking sill-sections the abutting ends of said interlocking sill-sections being connected by tenon-and-mortise joints and sectional floor-boards detachably interlocked with said sill-sections.

3. In a portable house, a floor comprising interlocking sill-sections, the abutting ends of said interlocking sill-sections being connected by tenon-and-mortise joints, sectional floor-boards detachably interlocked with said sill-sections, and lock-plates for holding said sill-sections against longitudinal movement.

4. In a portable house, a floor comprising interlocking sill-sections, the opposing ends of said sill-sections being united by tenon-and-mortise joints, the upper surface of one of said opposing ends being provided with a male lock-plate having a hook and the other of said opposing ends being provided with a female lock-plate having an eye to receive said hook.

5. In a portable house, a floor comprising interlocking sill-sections, said sill-sections having offset ledges or shoulders extending along their sides and serving to sustain the floor-boards adapted to set between parallel sill-sections and resting upon said ledges or shoulders and suitable means for detachably interlocking said floor-sections with said sill-sections.

6. In a portable house, a floor comprising interlocking sill-sections provided upon their sides with lock-plates and sectional floor-sections provided upon their under sides with key-plates adapted to enter the lock-plates of the sill-sections and detachably lock the floor-sections thereto.

7. In a portable house, a floor comprising sills having upon their sides lock-plates in combination with sectional floor-boards provided upon their under sides with key-plates adapted to enter the lock-plates on the sides of the sill-sections and detachably lock the floor-boards thereto.

8. In a portable house, a floor comprising interlocking sill-sections provided at their sides with lock-plates, and sectional floor-boards provided upon their under sides with inclined key-plates adapted to engage said lock-plates and detachably lock the floor-boards to the sill-sections.

9. In a portable house, a floor comprising interlocking sill-sections and sectional floor-boards setting between and engaging said sill-sections, said floor-board sections being provided at their opposing ends with interlocking supporting-bars.

10. In a portable house, a floor comprising sills provided upon their inner faces with locking-plates and floor-sections, each of said floor-sections having attached to its end a downwardly-extending supporting-bar, and key-plates extending between said supporting-bars and the floor-sections at the corners of said sections and adapted to enter the lock-plates on the sides of the sills.

11. In a portable house, a floor comprising interlocking sill-sections, the abutting ends of said sill-sections being united by tenon-and-mortise joints, lock-plates at said joints for holding the sections against longitudinal movement, lock-plates located upon the sides of said sill-sections and sectional floor-boards having upon their under sides key-plates adapted to engage the lock-plates on the sides of the sill-sections.

12. In a portable house, a knockdown roof-truss comprising rafters, a brace bar or plate pivotally connecting said rafters at one point and means for locking said brace bar or plate to one of said rafters at another point when said rafters are in extended position for use.

13. In a portable house, a knockdown roof-truss comprising rafters, a brace bar or plate rigidly connected to the end of one of said rafters and pivotally connected to the other of said rafters at a distance from its end and means for rigidly locking said rafter to the brace-plate that is pivoted thereto when the truss is in its extended position.

14. In a portable house, a knockdown roof-truss comprising rafters and a brace bar or plate pivotally connecting said rafters, one of said rafters being formed with an opening or slot extending lengthwise thereof to receive said brace bar or plate when the rafters are in extended position for use.

15. In a portable house, the combination with a rafter, of a stud-post and a brace bar or plate connecting said stud-post and rafter, said brace bar or plate being pivotally connected to one of said parts at one point and means for detachably locking said brace bar or plate to said part at another point.

16. In a portable house, a knockdown roof-frame comprising rafters, a brace bar or plate pivotally connecting said rafters, and vertical stud-posts and brace bars or plates extending between the upper ends of said stud-posts and the lower ends of the rafters and pivotally connecting said stud-posts to the lower ends of said rafters.

17. In a portable house, a knockdown frame comprising rafters, a brace bar or plate pivotally connecting the upper ends of said rafters, stud-posts and brace bars or plates extending between and pivotally connecting the lower ends of said rafters and the upper ends of said stud-posts.

18. In a portable house, a knockdown frame comprising pivoted rafters, stud-posts pivotally connected to said rafters and having laterally-extending lugs at their bottoms, and sills having sockets to extend over the lugs at the bottoms of said stud-posts.

19. In a portable house, a knockdown frame comprising rafters and stud-posts suitably pivoted together, said stud-posts being provided with offset lugs at their lower ends, and sills provided with socket-plates to extend over said offset lugs and hold the stud-posts against vertical movement.

20. In a portable house, a knockdown frame comprising rafters and stud-posts formed of pivoted angle-bar sections, portions of said angle-bar sections being arranged to extend outwardly therefrom when the rafters and stud-posts are in position for use.

21. In a portable house, a knockdown frame comprising bars angular in cross-section, said bars being pivoted together, the webs of said bars extending outwardly when the bars are in position for use and the laterally-projecting portions of said bars serving to support the side and roof boards.

22. A portable house comprising stud-posts provided at their lower ends with inwardly-extending lugs and sills provided with socket-plates having sockets to extend over and hold against vertical displacement said inwardly-extending lugs.

23. A portable house comprising stud-posts provided at their lower ends with inwardly-extending lugs, sectional side boards provided at their lower ends with downwardly-extending lugs, and sills provided with sockets to receive the downwardly-extending lugs of the side boards and with eyes to engage the inwardly-extending lugs at the lower ends of the stud-posts.

24. A portable house having knockdown rafters and stud-posts formed of bars angular in cross-section, said bars having their webs extending outwardly, open-ended pockets at the sides of said webs outside the laterally-extending portions of the bars, and sectional side and roof boards provided with hooks adapted to enter said pockets and hold said boards in position.

25. A portable house comprising rafters having lateral flanges whereon the roof-boards will rest, open-ended pockets arranged outside said flanges and roof-boards provided upon their inner faces with hooks adapted to enter said pockets and hold said boards upon the rafters.

26. A portable house comprising rafters having lateral flanges provided with open-ended inwardly and downwardly inclined pockets and roof-boards provided with hooks adapted to enter said pockets and hold said boards upon the rafters.

27. A portable house comprising a series of roof-trusses formed of pivoted rafters and a ridge-pole formed of individual sections, each of said individual sections being pivotally connected at one end to the upper end of the corresponding rafter and means for detachably uniting the opposite end of said ridge-pole section to the next succeeding rafter.

28. A portable house comprising knockdown roof-trusses provided at their joints with brace-plates and a king-post provided at its upper end with a socket-plate adapted to engage the brace-plate of the end roof-truss.

29. In a portable house, a side board provided with a window-opening and having slotted plates and pivoted keys at the sides of said opening, and a window-casing having at its sides sockets adapted to receive said keys.

30. In a portable house, a side board provided with a window-opening and having slotted plates and pivoted keys at the sides of said opening, and a window-casing having at its sides inclined sockets adapted to receive said keys.

31. A partition for a portable house comprising vertical division-plates, one at least of said division-plates being provided at top and bottom with pintles and one at least of said division-plates being provided at top and bottom with slotted socket-plates to receive said pintles.

32. A partition for a portable house, comprising division-plates, one at least of said division-plates being provided at top and bottom with pintles, and one at least of said division-plates being provided at top and bottom with sockets having curved slots to receive said pintles, said top and bottom pintles being of different lengths to permit them to be detachably connected with said sockets.

CHARLES H. RECTOR.

Witnesses:
GEO. P. FISHER, Jr.,
ALBERTA ADAMICK.